United States Patent
Kim et al.

(10) Patent No.: US 10,580,584 B2
(45) Date of Patent: Mar. 3, 2020

(54) MULTILAYER CERAMIC CAPACITOR

(71) Applicant: SAMSUNG ELECTRO-MECHANICS CO., LTD., Suwon-si, Gyeonggi-do (KR)

(72) Inventors: Tae Hoon Kim, Suwon-si (KR); Byung Kun Kim, Suwon-si (KR); Byung Chul Jang, Suwon-si (KR); Chang Hak Choi, Suwon-si (KR); Jung Deok Park, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/007,571

(22) Filed: Jun. 13, 2018

(65) Prior Publication Data

US 2019/0006107 A1     Jan. 3, 2019

(30) Foreign Application Priority Data

Jun. 28, 2017   (KR) .................. 10-2017-0081647
Oct. 19, 2017   (KR) .................. 10-2017-0135950

(51) Int. Cl.
*H01G 4/12*          (2006.01)
*H01G 4/30*          (2006.01)
(Continued)

(52) U.S. Cl.
CPC ............ *H01G 4/308* (2013.01); *H01G 4/012* (2013.01); *H01G 4/12* (2013.01); *H01G 4/224* (2013.01);
(Continued)

(58) Field of Classification Search
CPC ........ H01G 4/005; H01G 4/008; H01G 4/012; H01G 4/12; H01G 4/30; H01G 4/228; H01G 4/248; H01G 4/1227
See application file for complete search history.

(56) References Cited

U.S. PATENT DOCUMENTS

| 8,853,115 | B2 * | 10/2014 | Iguchi | .................. C04B 35/495 |
| | | | | 361/321.4 |
| 2003/0016484 | A1 * | 1/2003 | Iwaida | .................... B32B 18/00 |
| | | | | 361/306.3 |

(Continued)

FOREIGN PATENT DOCUMENTS

KR   10-2005-0075903 A    7/2005
KR   10-2006-0103834 A    10/2006
(Continued)

OTHER PUBLICATIONS

Korean Office Action dated Jun. 14, 2018 issued in Korean Patent Application No. 10-2017-0135950 (with English translation).

*Primary Examiner* — Nguyen T Ha
(74) *Attorney, Agent, or Firm* — Morgan, Lewis & Bockius LLP

(57) ABSTRACT

A multilayer ceramic capacitor includes a body including first and second dielectric layers and having first to sixth surfaces; a second internal electrode disposed on the second dielectric layer to face the first internal electrode with the first or second dielectric layer interposed therebetween, exposed to the fourth, fifth, and sixth surfaces, and disposed to be spaced apart from the third surface by a second space; a first dielectric pattern disposed in at least a portion of the first space; a second dielectric pattern disposed in at least a portion of the second space; a side insulating layer disposed on the fifth and sixth surfaces; a first external electrode disposed on the third surface; and a second external electrode disposed on the fourth surface, in which the first and (Continued)

second dielectric patterns have a color different from the first and second dielectric layers.

19 Claims, 8 Drawing Sheets

(51) Int. Cl.
   *H01G 4/248*   (2006.01)
   *H01G 4/012*   (2006.01)
   *H01G 4/224*   (2006.01)
   *H01G 4/232*   (2006.01)

(52) U.S. Cl.
   CPC ............... *H01G 4/248* (2013.01); *H01G 4/30* (2013.01); *H01G 4/232* (2013.01)

(56) References Cited

U.S. PATENT DOCUMENTS

| | | | | |
|---|---|---|---|---|
| 2006/0139848 | A1* | 6/2006 | Kim | ........................ H01G 4/012 361/306.3 |
| 2006/0214263 | A1* | 9/2006 | Kojima | ................... H01G 4/012 257/532 |
| 2010/0110609 | A1* | 5/2010 | Koh | ........................... C08J 5/18 361/323 |
| 2012/0140377 | A1 | 6/2012 | Kim et al. | |
| 2012/0147516 | A1 | 6/2012 | Kim et al. | |
| 2012/0307415 | A1* | 12/2012 | Lee | ........................... H01G 4/30 361/301.4 |
| 2013/0141837 | A1 | 6/2013 | Lee et al. | |
| 2014/0177134 | A1 | 6/2014 | Awata et al. | |
| 2015/0162131 | A1 | 6/2015 | Felten et al. | |
| 2015/0200055 | A1* | 7/2015 | Ishida | .................... H01G 4/012 361/301.4 |
| 2015/0325781 | A1* | 11/2015 | Rinner | ................... H01G 4/232 310/311 |
| 2017/0162322 | A1 | 6/2017 | Park et al. | |

FOREIGN PATENT DOCUMENTS

| | | |
|---|---|---|
| KR | 10-1141457 B1 | 5/2012 |
| KR | 10-2012-0062238 A | 6/2012 |
| KR | 10-2013-0063234 A | 6/2013 |
| KR | 10-2014-0082929 A | 7/2014 |
| KR | 10-2015-0019282 A | 2/2015 |
| KR | 10-2017-0065919 A | 6/2017 |

* cited by examiner

MULTILAYER CERAMIC CAPACITOR

CROSS-REFERENCE TO RELATED APPLICATION

This application is based on and claims the benefit of priority to Korean Patent Application Nos. 10-2017-0081647 filed on Jun. 28, 2017 and 10-2017-0135950 filed on Oct. 19, 2017 in the Korean Intellectual Property Office, the entire disclosure of which is incorporated herein by reference.

TECHNICAL FIELD

The present disclosure relates to a multilayer ceramic capacitor.

BACKGROUND

A capacitor is an element capable of storing electricity. Basically, two electrodes are opposed to each other, and when a voltage is applied, electricity is accumulated in each electrode. When a direct current (DC) voltage is applied, electricity is accumulated and current flows in the capacitor, but when accumulation is completed, no current flows in the capacitor. On the other hand, when an alternating current (AC) voltage is applied, AC current continues to flow, while polarities of the electrodes are alternately changed.

According to types of an insulator provided between electrodes, capacitors are classified as an aluminum electrolytic capacitor in which aluminum electrodes are configured and a thin oxide film is provided between the aluminum electrodes, a tantalum capacitor using tantalum as an electrode material, a ceramic capacitor using a high-k dielectric material such as barium titanate between electrodes, a multilayer ceramic capacitor (MLCC) in which high-k ceramics having a multilayer structure is used as a dielectric material provided between electrodes, a film capacitor using a polystyrene film as a dielectric material between electrodes, and the like.

The MLCCs, among the capacitors, which advantageously have excellent temperature characteristics and frequency characteristics and may be realized at a small size, have recently been commonly applied in various fields such as high frequency circuits.

In MLCCs of the related art, a plurality of dielectric sheets may be stacked to form a multilayer body, external electrodes having opposite polarities may be formed on an outer side of the multilayer body, and internal electrodes alternately stacked on an inner side of the multilayer body may be electrically connected to each of the external electrodes.

Recently, as electronic products have increasingly been miniaturized and highly integrated, research into miniaturization and high integration of MLCCs has actively been undertaken. In particular, in the case of MLCCs, various attempts have been made to improve connectivity of internal electrodes, while making a dielectric layer thinner, to stack more dielectric layers to increase capacity and reduce a size.

In particular, in the development of super-high-capacity MLCCs, ensuring reliability for multilayer products of thin dielectric layers and internal electrodes is becoming more important. As the number of stacked layers increases, a step increases due to a difference in thickness between the internal electrodes and the dielectric layers. Such a step causes ends of electrodes to be bent due to horizontal stretching of the dielectric layers during densification of pressing a body.

That is, the ends of the internal electrodes are bent to fill the step, and margin portions eliminate an empty space due to the step due to depression of a cover and a reduction of a margin width. A capacitive layer is also stretched by the margin width reduced as the empty space due to the step is eliminated. The structural irregular stretching of the internal electrodes results in a reduction of reliability such as breakdown voltage (BDV) characteristics, and the like, of an MLCC.

Generation of the step may be a problem in both a first direction perpendicular to a stacking direction of the MLCC and a second direction perpendicular to the stacking direction and the first direction, so a solution thereto is required.

SUMMARY

An aspect of the present disclosure may provide a multilayer ceramic capacitor having a structure solving a step problem due to thicknesses of a dielectric layer and internal electrodes.

According to an aspect of the present disclosure, a multilayer ceramic capacitor may include: a body including first and second dielectric layers and having a first surface and a second surface opposing each other in a stacking direction, a third surface and a fourth surface connected to the first surface and the second surface and opposing each other, and a fifth surface and a sixth surface connected to the first through fourth surfaces and opposing each other; a first internal electrode disposed on the first dielectric layer, exposed to the third, fifth, and sixth surfaces, and disposed to be spaced apart from the fourth surface by a first space; a second internal electrode disposed on the second dielectric layer to face the first internal electrode with the first or second dielectric layer interposed therebetween, exposed to the fourth, fifth, and sixth surfaces, and disposed to be spaced apart from the third surface by a second space; a first dielectric pattern disposed in at least a portion of the first space; a second dielectric pattern disposed in at least a portion of the second space; side insulating layers disposed on the fifth and sixth surfaces; a first external electrode connected to the first internal electrode and disposed on the third surface; and a second external electrode connected to the second internal electrode and disposed on the fourth surface, in which the first and second dielectric patterns have a color different from the first and second dielectric layers.

According to another aspect of the present disclosure, a multilayer ceramic capacitor may include: a body including a plurality of dielectric layers and having a first surface and a second surface facing each other in a stacking direction, a third surface and a fourth surface facing each other in a length direction, and a fifth surface and a sixth surface facing each other in a width direction; a plurality of first and second internal electrodes disposed in the body to be alternately exposed through the third and fourth surfaces, having the plurality of dielectric layers therebetween; a plurality of first dielectric patterns disposed between the plurality of first internal electrodes and the fourth surface; and a plurality of second dielectric patterns disposed between the plurality of second internal electrodes and the third surface, in which the plurality of first and second dielectric patterns extend to cover end portions of the plurality of first and second internal electrodes, respectively, in the stacking direction.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will be described in detail with reference to the accompanying drawings.

Multilayer Ceramic Electronic Component

Figure 1:
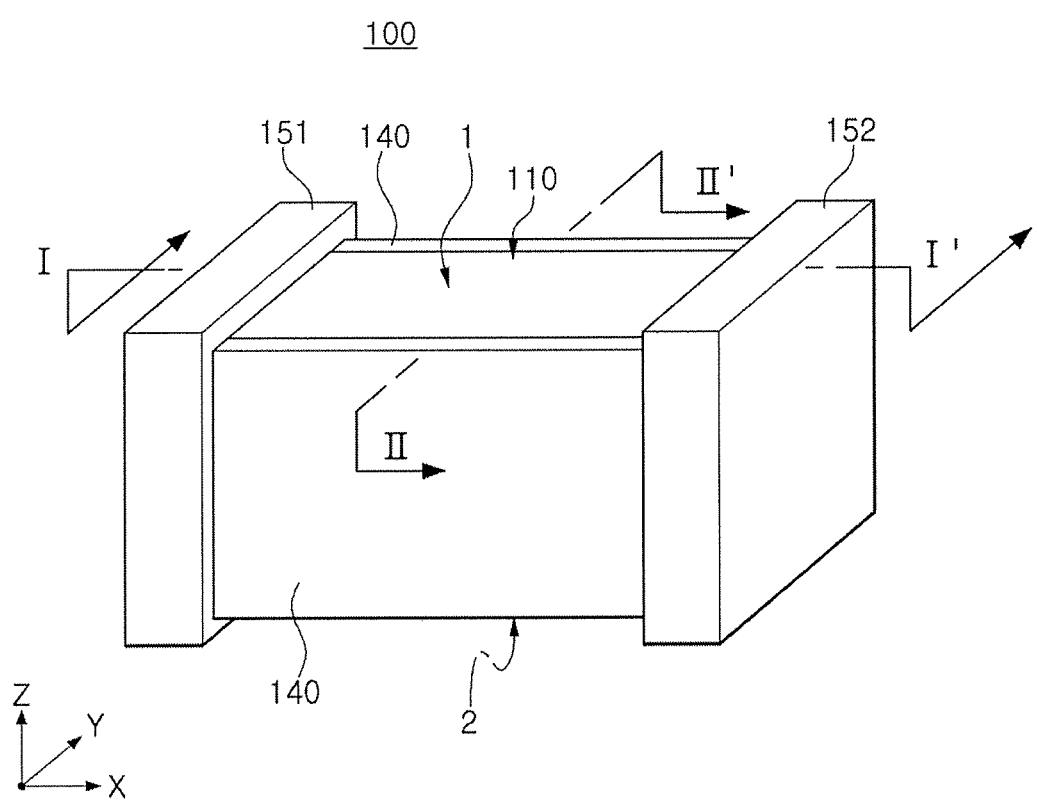
FIG. 1 is a schematic perspective view of a multilayer ceramic capacitor (MLCC) according to an exemplary embodiment in the present disclosure.
Figure 2:
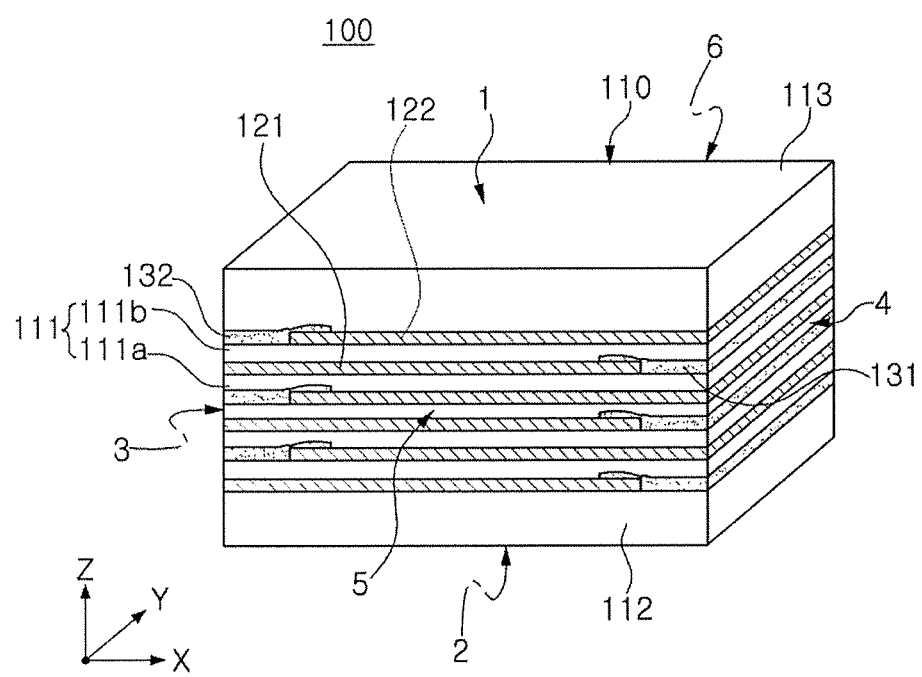
FIG. 2 is a schematic perspective view of a body of an MLCC according to an exemplary embodiment in the present disclosure.
Figure 3:
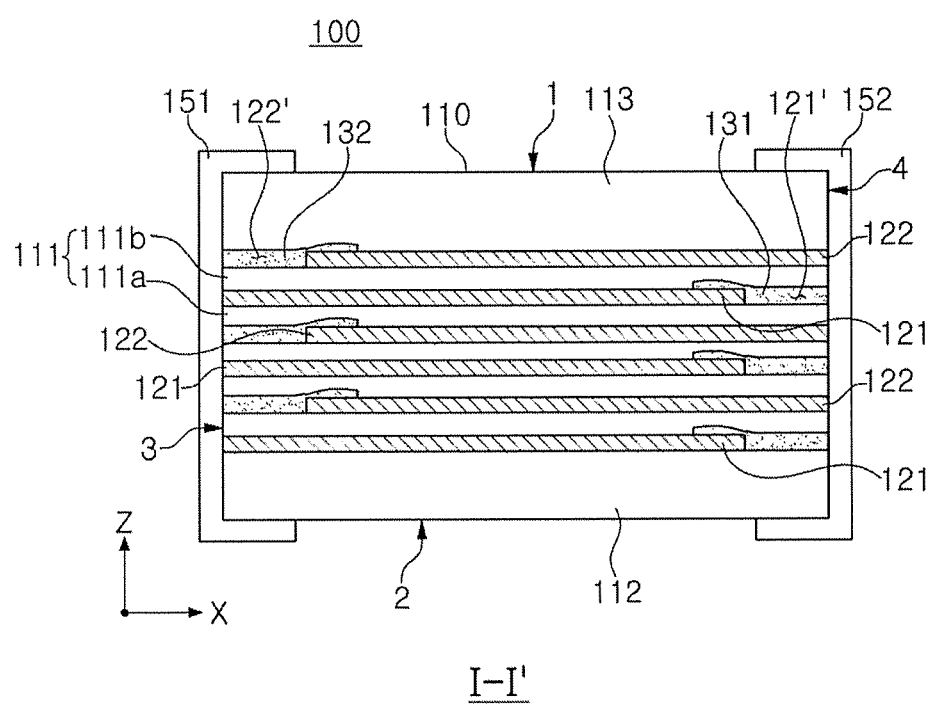
FIG. 3 is a cross-sectional view, taken along line I-I' of FIG. 1.
Figure 4:
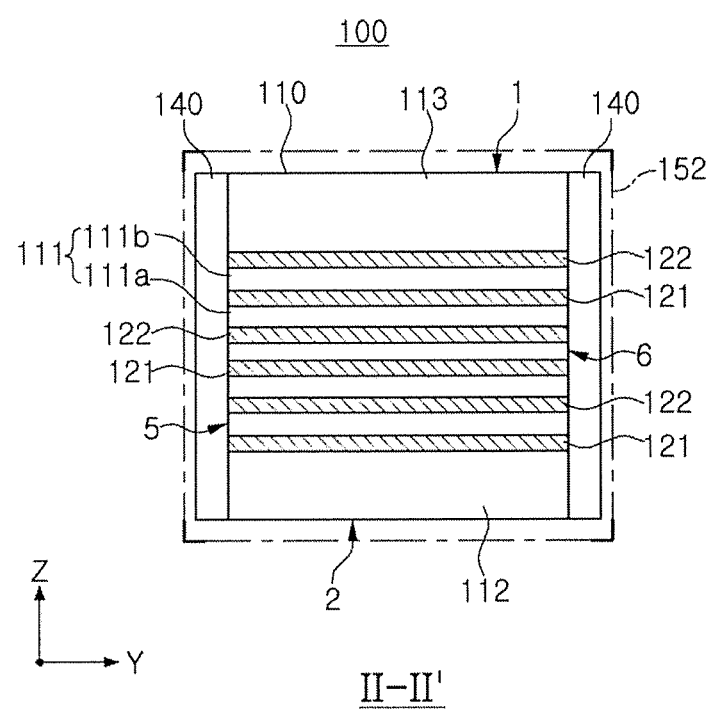
FIG. 4 is a cross-sectional view, taken along line II-II' of FIG. 1.

FIG. 1 is a schematic perspective view of a multilayer ceramic capacitor (MLCC) according to an exemplary embodiment in the present disclosure, FIG. 2 is a schematic perspective view of a body of an MLCC according to an exemplary embodiment in the present disclosure, FIG. 3 is a cross-sectional view, taken along line I-I' of FIG. 1, and FIG. 4 is a cross-sectional view, taken along line II-II' of FIG. 1;

Hereinafter, an MLCC 100 according to an exemplary embodiment in the present disclosure will be described with reference to FIGS. 1 through 3.

The MLCC 100 according to an exemplary embodiment in the present disclosure includes a body 110 in which a plurality of first and second dielectric layers 111a and 111b are stacked, a first external electrode 151, and a second external electrode 152.

The body 110 is formed by stacking the plurality of dielectric layers 111a and 111b in the thickness direction and subsequently sintering the same. The amount of the dielectric layers 111a and 111b may be appropriately adjusted, and it is also possible to stack tens to hundreds of layers. Here, the dielectric layers 111a and 111b adjacent to each other in the body 110 may be integrated such that boundaries therebetween may not be readily apparent. The body 110 may have a hexahedral shape but is not limited thereto.

When the body 110 is a hexahedron, the body 110 may include a first surface 1 and a second surface 2 opposing each other in the stacking direction, a third surface 3 and a fourth surface 4 connected to the first surface 1 and the second surface 2 and opposing each other, and a fifth surface 5 and a sixth surface 6 connected to the first through fourth surfaces 1, 2, 3 and 4 and opposing each other.

Here, the stacking direction may be a thickness direction or a first direction (Z), a direction in which the third surface 3 and the fourth surface 4 are formed may be referred to as a length direction or a second direction (X), and a direction in which the fifth surface 5 and the sixth surface 6 are formed may be referred to as a width direction or a third direction (Y).

Lower and upper cover layers 112 and 113 having a predetermined thickness may be formed on a lower surface of a lowermost internal electrode and an upper surface of an uppermost internal electrode in the body 110. Here, the lower cover layer 112 and the upper cover layer 113 may have the same composition as that of the dielectric layers 111a and 111b and may be formed by stacking at least one dielectric layer not including an internal electrode on each of an upper surface of the uppermost internal electrode of the body 110 and a lower surface of the lowermost internal electrode in the body 110.

The first and second dielectric layers 111a and 111b may include a ceramic material having a high dielectric constant, for example, $BaTiO_3$ (barium titanate)-based ceramic powder, but is not limited thereto. The $BaTiO_3$-based ceramic powder may include, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$, prepared by partially employing calcium (Ca), zirconium (Zr), and the like, in $BaTiO_3$, but is not limited thereto. The dielectric layers 111a and 111b may further include at least one of a ceramic additive, an organic solvent, a plasticizer, a binder, and a dispersant. The ceramic additive may be, for example, a transition metal oxide or a carbide, a rare earth element, magnesium (Mg), or aluminum (Al), and the like.

The first internal electrode 121 is disposed on the first dielectric layer 111a. The first internal electrode 121 is disposed on the first dielectric layer 111a such that the first internal electrode 121 is exposed to the third surface 3, the fifth surface 5, and the sixth surface 6 of the body 110. Here, the first internal electrode 121 is arranged to be spaced apart from the fourth surface 4 by a predetermined distance. A region between the first internal electrode 121 and the fourth surface 4 may be defined as a first space 121'.

The second internal electrode 122 is disposed on the second dielectric layer 111b. The second internal electrode 122 is disposed on the second dielectric layer 111b such that the second internal electrode 122 is exposed to the fourth surface 4, the fifth surface 5, and the sixth surface 6 of the body 110. Here, the second internal electrode 122 is disposed to be spaced apart from the third surface 3 by a predetermined distance. A region between the second internal electrode 122 and the third surface 3 may be defined as a second space 122'.

The first and second internal electrodes 121 and 122 are formed on ceramic sheets forming the first dielectric layer 111a and the second dielectric layer 111b and stacked and subsequently sintered so as to be alternately disposed in the thickness direction within the body 110 with one dielectric layer 111a or 111b interposed therebetween.

The first and second internal electrodes 121 and 122 having opposite polarities are arranged to face each other in the stacking direction of the dielectric layers 111a and 111b and electrically insulated by the dielectric layers 111a and 111b interposed therebetween.

When the internal electrodes are exposed to the outside of the body, a short circuit may occur due to an introduction of a conductive foreign material, or the like, degrading reliability of the MLCC. Therefore, in the related art, when the internal electrodes are formed in the dielectric layer, the area of the dielectric layer is formed to be larger than the area of the internal electrodes and a margin portion is formed in the remaining peripheral portion excluding portions of the internal electrodes connected to the external electrodes. That is, the margin portion refers to a region of the dielectric in which the internal electrode is not formed. When the internal electrode is formed in the dielectric layer during a manufacturing process, the internal electrode has a shape as if it protrudes from the margin portion. Due to the protruding shape, a step is generated, and when tens to hundreds of dielectric layers are stacked, the dielectric layers are stretched to fill the steps. When the dielectric layers are stretched, the internal electrodes are also bent. When the internal electrodes are bent, a breakdown voltage (BDV) is reduced at the corresponding portions.

Accordingly, in the MLCC 100 according to an exemplary embodiment in the present disclosure, margin portions on the fifth surface 5 and the sixth surface 6 of the body 110 are removed to prevent generation of a step due to the internal electrodes. Accordingly, the internal electrodes are prevented from being bent in the width direction, preventing a reduction in the breakdown voltage, improving reliability of the MLCC.

The first internal electrode 121 or the second internal electrode 122 is formed to be led to the third surface 3 or the fourth surface 4. However, since the first external electrode 151 is formed on the third surface 3 and the second external electrode 152 is formed on the fourth surface 4 thereafter, the first internal electrode 121 and the second internal electrode 122 are not exposed to the outside but may be protected by the first external electrode 151 and the second external electrode 152.

However, since both the first internal electrode 121 and the second internal electrode 122 are exposed to the fifth surface 5 and the sixth surface 6, a separate side insulating layer 140 is required to be disposed on the fifth surface 5 and the sixth surface 6 to protect the internal electrodes formed on the inner side thereof.

In order to form the side insulating layer 140, the body 110 may be dipped into a ceramic-containing slurry. The slurry may include ceramic powder, an organic binder, and an organic solvent. As the ceramic powder, a material having a high dielectric constant and having excellent heat resistance and durability supporting a wide operation range when the side insulating layer 140 is formed may be used.

The ceramic powder may use, but is not limited to, a barium titanate-based material, a lead composite perovskite-based material, a strontium titanate-based material, and the like, and preferably, barium titanate powder.

The organic binder is used to ensure dispersibility of the ceramic powder in the slurry, and ethyl cellulose, polyvinyl butyral, and mixtures thereof may be used as the organic binder but a material of the organic binder is not limited thereto.

When the body 110 is dipped into the slurry prepared thusly, the slurry is applied to a surface of the body 110 adhered to the slurry to form the side insulating layer 140. Also, in order to form the body 110 having a desired thickness, dipping and drying may be repeated to apply a desired amount of slurry to the body 110.

In case where the body 110 is dipped into the slurry, since the external electrodes 151 and 152 are required to be formed on the third surface 3 and the fourth surface 4 of the body 110, it is necessary to prevent application of the slurry to the third surface 3 and the fourth surface 4. Therefore, in order to prevent the third surface 3 and the fourth surface 4 from being exposed to the outside, the body 110 may be dipped into the slurry in a state in which a film is adhered to the third surface 3 and the fourth surface 4, or alternatively, the body 110 may be dipped into the slurry in a state in which the third surface 3 and the fourth surface 4 are not exposed before they are cut, but the present disclosure is not limited thereto. That is, slurry may be applied to the fifth surface 5 and the sixth surface 6 of the body 110 through the dipping.

Since the side insulating layer 140 is disposed on the fifth surface 5 and the sixth surface 6, a conductive foreign material is prevented from being introduced to the internal electrodes exposed to the fifth surface 5 and the sixth surface 6.

The side insulating layer 140 may be formed using a polymer. For example, the side insulating layer 140 may be formed by applying an epoxy to the side surface of the body 110.

In the MLCC 100 according to an exemplary embodiment in the present disclosure, by removing margin portions on the fifth and sixth surfaces 5 and 6, a maximum effective capacitance area may be secured to further enhance capacitance of the MLCC. That is, in the MLCC 100 according to an exemplary embodiment in the present disclosure, the side insulating layer 140, which is relatively thinner than the margin portion and may prevent an introduction of a conductive foreign material is disposed on the fifth surface 5 and the sixth surface 6, thereby increasing a volume for realizing capacitance in the MLCC 100.

However, a step is also generated in the length direction in which the internal electrode is connected to the external electrode, similarly to generation of the step due to the margin portion in the width direction. That is, although generation of the step due to the margin portion in the width direction is resolved, the breakdown voltage characteristics of the MLCC may not be improved by a target value due to the step in the length direction.

The first and second internal electrodes 121 and 122 are alternately exposed to the third surface 3 and the fourth surface 4, opposing end surfaces of the body in the length direction, and connected to the first and second external electrodes 151 and 152, respectively.

That is, the first internal electrode 121 is connected to only the first external electrode 151 and the second internal electrode 122 is connected to only the second external electrode 152. Accordingly, the first internal electrode 121 is spaced apart from the fourth surface 4 by a predetermined distance and the second internal electrode 122 is spaced apart from the third surface 3 by a predetermine distance.

In case where the dielectric layers on which the internal electrodes having such a shape are formed are stacked, since the first and second internal electrodes 121 and 122 are alternately exposed to the third surface 3 and the fourth surface 4, a step is generated in the portion where only the first internal electrode 121 or the second internal electrode 122 is formed in the stacking direction Z.

In case where tens to hundreds of dielectric layers 111 are stacked, the dielectric layers 111 are stretched due to the step in the portion where only the first internal electrode 121 or only the second internal electrode 122 is formed in the stacking direction Z. Due to the stretched dielectric layers, the first internal electrode 121 or the second internal electrode 122 in the portion where only the first internal electrode 121 or the second internal electrode 122 is formed is also bent together in the stacking direction. Here, breakdown voltage characteristics are mainly reduced at the portion where the internal electrode is bent.

In contrast, in the capacitor 100 according to an exemplary embodiment in the present disclosure, when a region between the first internal electrode 121 and the fourth surface 4 is defined as a first space 121', a first dielectric pattern 131 is disposed in the first space 121', and when a region between the second internal electrode 122 and the third surface 3 is defined as a second space 122', a second dielectric pattern 132 may be disposed in the second space 122', thus preventing generation of a step in the portion where only the first internal electrode 121 or the second internal electrode 122 is formed.

That is, since the capacitor according to an exemplary embodiment in the present disclosure includes the first and second dielectric patterns 131 and 132, generation of a step in the portion where only the first internal electrode 121 or the second internal electrode 121, among the first and second internal electrodes 121 and 122, is formed may be prevented so that a reduction in the breakdown voltage characteristics generated at the portion where the internal electrode is bent may be resolved.

Therefore, in the MLCC 100 according to an exemplary embodiment in the present disclosure, since the margin portion is removed from the fifth and sixth surfaces 5 and 6 and the side insulating layer 140 is disposed instead, a reduction in the breakdown voltage characteristics due to a step in the width direction may be prevented, and at the same time, generation of a step in the portion where only the first internal electrode 121 or only the second internal electrode 122, among the first and second internal electrodes 121 and 122, is formed is prevented due to presence of the first and second dielectric patterns 131 and 132, whereby a reduction in the breakdown voltage characteristics due to a step in the length direction is resolved, substantially enhancing the overall breakdown voltage characteristics of MLCC 100.

Also, in the capacitor according to an exemplary embodiment in the present disclosure, the first and second dielectric patterns 131 and 132 have colors different from the first and second dielectric layers 111a and 111b.

The first and second dielectric patterns 131 and 132 may be formed to be printed in the space between the internal electrodes on ceramic sheets on which the internal electrodes are printed, and dielectrics having different colors may be used for align matching of first printing and later printing. As a printing method, a screen method may be used or any printing method such as a roll-to-roll method, and the like, may be used.

In the case of using the screen method, a printed material may be viewed first and printing may performed by adjusting a position. The use of the roll-to-roll method, a continuous process, may enhance productivity. A patterning-available roll-to-roll method may include, for example, an offset printing method, a gravure printing method, a gravure offset printing method, and the like.

Figure 5A:
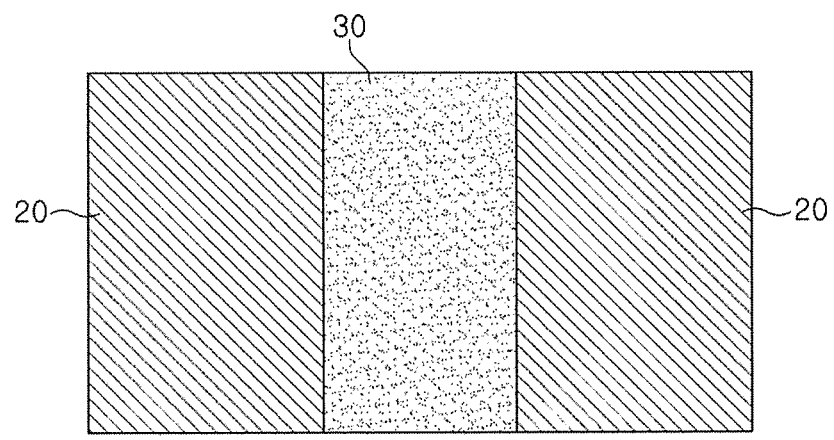
FIG. 5A is a view illustrating a case in which internal electrodes and a dielectric pattern disposed on a ceramic sheet are aligned without deviation during a manufacturing process and FIG. 5B is a cross-sectional view of FIG. 5A.
Figure 5B:
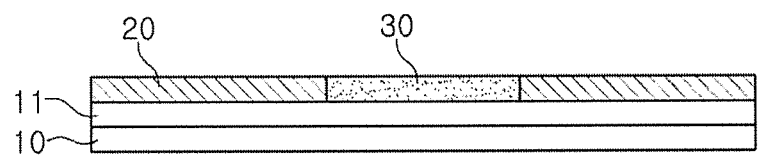
Figure 6A:
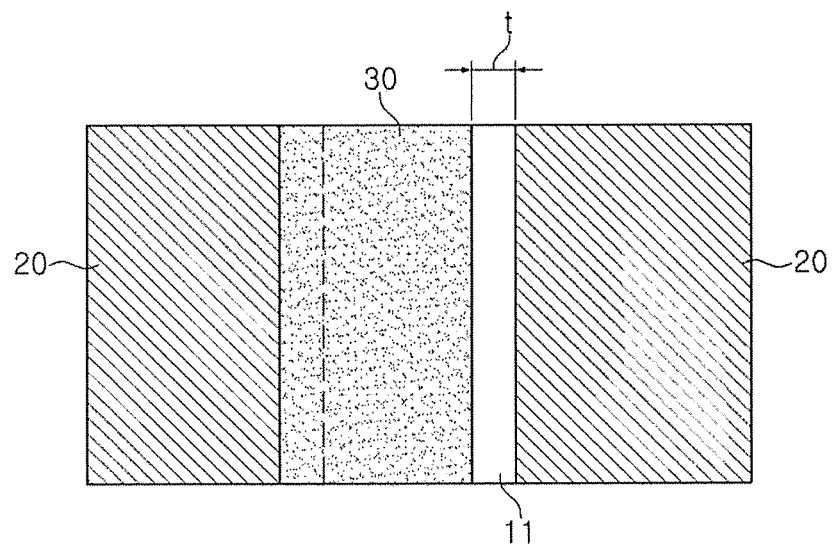
FIG. 6A is a view illustrating a case in which internal electrodes and a dielectric pattern disposed on a ceramic sheet are misaligned during a manufacturing process and FIG. 6B is a cross-sectional view of FIG. 6A.
Figure 6B:
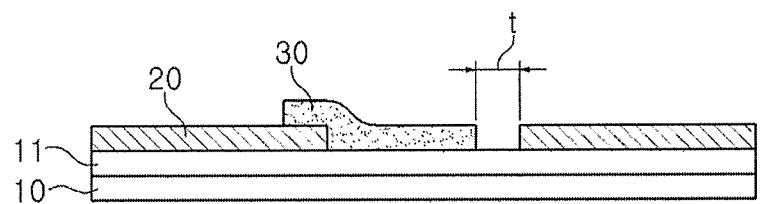

FIG. 5A is a view illustrating a case in which internal electrodes 20 and a dielectric pattern 30 disposed on a ceramic sheet are aligned without deviation during a manufacturing process and FIG. 5B is a cross-sectional view of FIG. 5A. FIG. 6A is a view illustrating a case in which internal electrodes 20 and a dielectric pattern 30 disposed on a ceramic sheet are misaligned during a manufacturing process and FIG. 6B is a cross-sectional view of FIG. 6A.

Referring to FIGS. 5A, 5B, 6A, and 6B, in a step of forming the internal electrodes 20 and the dielectric pattern 30 during the manufacturing process of the MLCC, the ceramic sheet 11 is formed on a jig 10, the internal electrodes 20 are printed on one surface of the ceramic sheet 11, and the dielectric pattern 30 is then printed between the internal electrodes 20 in the length direction X of the printed internal electrodes. After the manufacturing is completed, the ceramic sheet 11 becomes the first and second dielectric layers 111a and 111b and the dielectric pattern 30 becomes the first and second dielectric patterns 131 and 132.

Here, accurately forming the dielectric pattern 30 in a desired position is an important factor to lower a defective rate. Thus, the dielectric pattern 30 must be accurately formed between the internal electrodes 20 as illustrated in FIG. 5A, but if the dielectric pattern 30 is not accurately printed in a desired position due to a manufacturing error, the dielectric pattern 30 deviates by t to one side as illustrated in FIG. 6A. As illustrated in FIGS. 6A and 6B, when the dielectric pattern 30 deviates by t to one side between the internal electrodes 20 so the dielectric pattern 30 is not in contact with the other internal electrode 20, the step problem due to the internal electrode 20 cannot be solved in spite of formation of the dielectric pattern 30. In this case, after printing is completed, it is possible to arrange the dielectric pattern 30 accurately between the internal electrodes 20 as illustrated in FIGS. 5A and 5B through additional printing.

In case where the dielectric pattern 30 has the same color as the ceramic sheet 11, it is not easy to print the dielectric pattern in an accurate position and it is not easy to adjust alignment through tension adjustment.

However, in the capacitor according to an exemplary embodiment in the present disclosure, since the first and second dielectric patterns 131 and 132 have colors different from the first and second dielectric layers 111a and 111b, it is easy to print the dielectric pattern in the accurate position, it is easy to adjust alignment when the roll-to-roll method is applied, and since the first and second dielectric patterns 131 and 132 may be accurately disposed in the first and second spaces 121' and 122', respectively, productivity and reliability of the MLCC may be further improved.

In order to prevent the dielectric pattern 30 from deviating to one side between the internal electrodes 20 due to a manufacturing error, the dielectric pattern 30 may be disposed to have an overlap portion O covering ends of the internal electrodes 20.

Figure 7A:
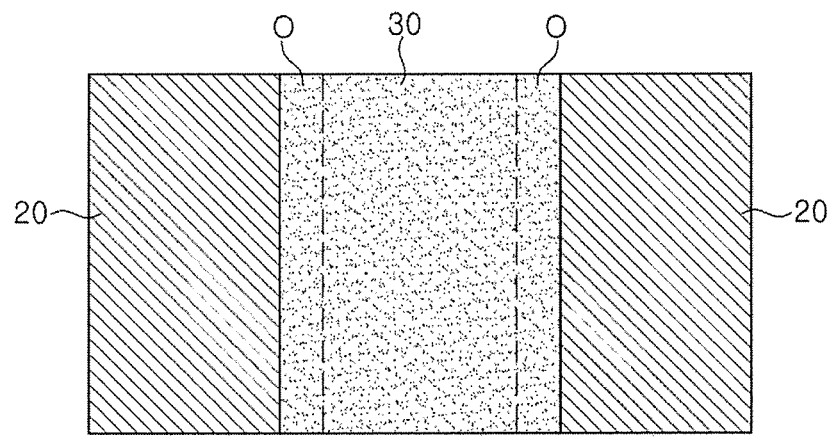
FIG. 7A is a view illustrating a case in which internal electrodes and a dielectric pattern arranged on a ceramic sheet are aligned without deviation during a manufacturing process using a dielectric pattern having a width larger than an interval between the internal electrodes.
Figure 7B:
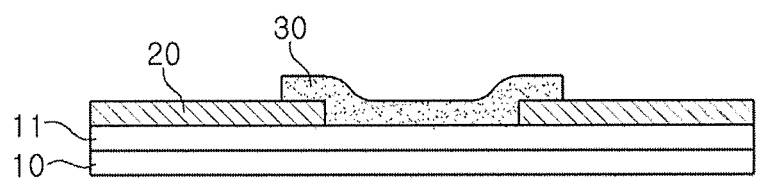
FIG. 7B is a cross-sectional view of FIG. 7A.
Figure 8A:
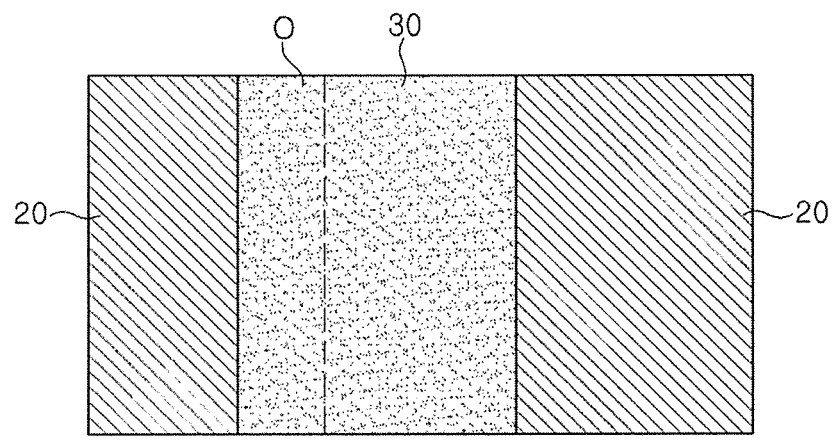
FIG. 8A is a view illustrating a case in which internal electrodes and a dielectric pattern arranged on a ceramic sheet are misaligned during a manufacturing process using a dielectric pattern having a width larger than an interval between the internal electrodes.
Figure 8B:
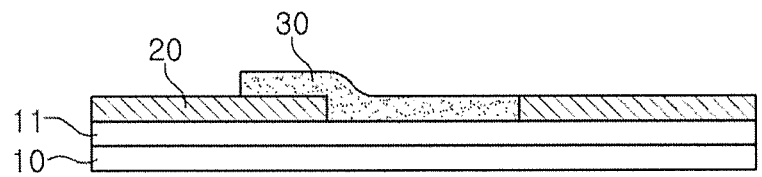
FIG. 8B is a cross-sectional view of FIG. 8A.

FIG. 7A is a view illustrating a case in which internal electrodes 20 and a dielectric pattern 30 arranged on a ceramic sheet are aligned without deviation during a manufacturing process using a dielectric pattern having a width larger than an interval between the internal electrodes, and FIG. 7B is a cross-sectional view of FIG. 7A. FIG. 8A is a view illustrating a case where internal electrodes 20 and a dielectric pattern arranged on a ceramic sheet are misaligned during a manufacturing process using a dielectric pattern having a width larger than an interval between the internal electrodes 20, and FIG. 8B is a cross-sectional view of FIG. 8A.

Referring to FIGS. 7A, 7B, 8A, and 8B, since the dielectric pattern 30 extends to cover the end portion of the internal electrode 20, even in case where the dielectric pattern 30 is formed to deviate to one side between the internal electrodes 20 as illustrated in FIG. 5A, as well as in case where the dielectric pattern 30 is accurately formed in a desired position as illustrated in FIG. 6A, a step problem due to the internal electrodes 20 may be solved. In addition, by forming the dielectric pattern 30 to be thicker than the internal electrodes 20, occurrence of a short-circuit between the internal electrodes in the stacking direction due to a thrust phenomenon of the dielectric layer and the internal electrodes when compressed may be prevented.

Accordingly, the first dielectric pattern 131 may extend to cover the end portion of the first internal electrode 121 in the stacking direction and the second dielectric pattern 132 may extend to cover the end portion of the second internal electrode 122 in the stacking direction. Alternatively, the first dielectric pattern 131 may extend to cover the end portion of the first internal electrode 121 in the stacking direction or the second dielectric pattern 132 may extend to cover the end portion of the second internal electrode 122 in the stacking direction.

In order to make the first and second dielectric patterns 131 and 132 have colors different from the first and second dielectric layers 111a and 111b, a known colorant may be used and both a pigment and a dye may be used.

However, in the case of a pigment or a dye in the form of pure organic substance, plastic density of the MLCC may be improved and rigidity of the MLCC may be lowered.

According to results of experiment conducted by the inventors of the present disclosure, it was confirmed that the use of a metal complex dye, which includes a metal complex containing a metal in the form of complex salts as molecular compound and a dye containing phthalocyanine including Cu does not degrade unique characteristics of the MLCC.

Also, metals of the metal complex dye include, for example, Ni, Cr, Co, and Cu, but are not limited thereto.

Here, the content of the metal complex may be 0.05 to 3 wt % with respect to the overall mass of the MLCC, and the metal content of the metal complex may be 0.001 to 0.1 wt % with respect to the overall mass of the multilayer ceramic capacitor.

If the content of the metal complex is less than 0.05 wt % or if the metal content of the metal complex is less than 0.001 wt %, a recognition rate during printing may be lowered. On the other hand, if the content of the metal complex exceeds 3 wt % or if the metal content of the metal complex exceeds 0.1 wt %, compactness of the MLCC may be lowered and the characteristics of the MLCC may be deteriorated.

Further, in order to make the first and second dielectric patterns 131 and 132 have colors different from the first and second dielectric layers 111a and 111b, a metal complex may be included in the first and second dielectric patterns 131 and 132 or a metal complex may be included in the first and second dielectric layers 111a and 111b.

However, when a metal complex is included in the first and second dielectric layers 111a and 111b, the internal electrodes may be affected because an area in which the first and second dielectric layers 111a and 111b are in contact with the internal electrodes is large, and thus, the metal complex is preferably included in the first and second dielectric patterns 131 and 132.

The first and second external electrodes 151 and 152 are disposed on the third and fourth surfaces 3 and 4 and connected to the first and second internal electrodes 121 and 122, respectively. In addition, the first and second external electrodes 151 and 152 may extend to cover portions of the first surface 1, the second surface 2, the side insulating layers 140.

As a result, in the MLCC according to an exemplary embodiment in the present disclosure, since the first and second internal electrodes 121 and 122 are arranged to be exposed to the fifth surface S and the sixth surface 6, a step problem caused due to the margin portions may be solved, and since the first and second dielectric patterns 131 and 132 are disposed only in the first and second spaces 121' and 122' corresponding to the portions where only the first internal electrode 121 or only the second internal electrode 122, among the first and second internal electrodes 121 and 122, is formed, the step problem caused by the portions where only the first internal electrode 121 or only the second internal electrode 122, among the first and second internal electrodes 121 and 122, is formed may be solved.

Also, since the first and second dielectric patterns 131 and 132 have a color different from the first and second dielectric layers 111a and 111b, it is easy to print the dielectric pattern in an accurate position, and since it is easy to adjust alignment through adjustment of tensile force, the first and second dielectric patterns 131 and 132 may be accurately positioned in the first and second spaces 121' and 122', respectively, further improving productivity and reliability of the MLCC.

Accordingly, the MLCC according to an exemplary embodiment in the present disclosure may have significantly improved breakdown voltage characteristics, productivity, and reliability, as compared with the related art MLCC.

As set forth above, in the MLCC according to exemplary embodiments in the present disclosure, since the first and second internal electrodes 121 and 122 are exposed to the fifth and sixth surfaces 5 and 6, opposing end surfaces of the body 110 in the width direction, a step is not generated due to the internal electrodes on the opposing end surfaces of the body 110 in the width direction, and since the first and second dielectric patterns 131 and 132 are provided to complement the steps at opposing ends of the body 110 in the length direction, generation of a step on opposing end surfaces of the body 110 in the length direction due to the internal electrodes is prevented, enhancing reliability of the MLCC.

Further, since the first and second dielectric patterns 131 and 132 have a color different from the first and second dielectric layers 111a and 111b, alignment is facilitated when the first and second dielectric patterns 131 and 132 are printed, improving productivity and reliability of the MLCC.

While exemplary embodiments have been shown and described above, it will be apparent to those skilled in the art that modifications and variations could be made without departing from the scope of the present disclosure as defined by the appended claims.

What is claimed is:

1. A multilayer ceramic capacitor comprising:
   a body including first and second dielectric layers and having a first surface and a second surface opposing each other in a stacking direction, a third surface and a fourth surface connected to the first surface and the second surface and opposing each other, and a fifth surface and a sixth surface connected to the first through fourth surfaces and opposing each other;
   a first internal electrode disposed on the first dielectric layer, exposed to the third, fifth, and sixth surfaces, and disposed to be spaced apart from the fourth surface by a first space;
   a second internal electrode disposed on the second dielectric layer to face the first internal electrode with the first or second dielectric layer interposed therebetween, exposed to the fourth, fifth, and sixth surfaces, and spaced apart from the third surface by a second space;
   a first dielectric pattern disposed in at least a portion of the first space;
   a second dielectric pattern disposed in at least a portion of the second space;
   side insulating layers disposed on the fifth and sixth surfaces;

a first external electrode connected to the first internal electrode and disposed on the third surface; and a second external electrode connected to the second internal electrode and disposed on the fourth surface, wherein the first and second dielectric patterns have a color different from the first and second dielectric layers.

2. The multilayer ceramic capacitor of claim 1, wherein the first and second dielectric layers include a metal complex.

3. The multilayer ceramic capacitor of claim 1, wherein the first and second dielectric patterns include a metal complex.

4. The multilayer ceramic capacitor of claim 3, wherein the content of the metal complex is 0.05 to 3 wt % with respect to an overall mass of the multilayer ceramic capacitor.

5. The multilayer ceramic capacitor of claim 3, wherein the metal content of the metal complex is 0.001 to 0.1 wt % with respect to an overall mass of the multilayer ceramic capacitor.

6. The multilayer ceramic capacitor of claim 3, wherein the metal complex includes at least one of Ni, Cr, Co, and Cu.

7. The multilayer ceramic capacitor of claim 1, wherein the first and second dielectric patterns include phthalocyanine including Cu.

8. The multilayer ceramic capacitor of claim 1, wherein the first or second dielectric pattern is printed through a roll-to-roll method.

9. The multilayer ceramic capacitor of claim 1, wherein the first dielectric pattern extends to cover an end portion of the first internal electrode in the stacking direction, and the second dielectric pattern extends to cover an end portion of the second internal electrode in the stacking direction.

10. The multilayer ceramic capacitor of claim 1, wherein the first dielectric pattern extends to cover an end portion of the first internal electrode in the stacking direction, or the second dielectric pattern extends to cover an end portion of the second internal electrode in the stacking direction.

11. The multilayer ceramic capacitor of claim 1, wherein the side insulating layers include ceramics.

12. The multilayer ceramic capacitor of claim 1, wherein the side insulating layers include polymer.

13. The multilayer ceramic capacitor of claim 1, wherein the first and second external electrodes extend to cover portions of the first surface, the second surface, and the side insulating layers.

14. The multilayer ceramic capacitor of claim 1, further comprising:

a lower cover layer having a predetermined thickness disposed on a lower surface of a lowermost internal electrode; and an upper cover layer having a predetermined thickness disposed on an upper surface of an uppermost internal electrode, wherein the lower cover layer and the upper cover layer have the same composition as the first and second dielectric layers.

15. A multilayer ceramic capacitor comprising:

a body including a plurality of dielectric layers and having a first surface and a second surface facing each other in a stacking direction, a third surface and a fourth surface facing each other in a length direction, and a fifth surface and a sixth surface facing each other in a width direction; a plurality of first and second internal electrodes disposed in the body to be alternately exposed through the third and fourth surfaces, having the plurality of dielectric layers therebetween;

a plurality of first dielectric patterns disposed between the plurality of first internal electrodes and the fourth surface; and a plurality of second dielectric patterns disposed between the plurality of second internal electrodes and the third surface, wherein the plurality of first and second dielectric patterns extend to cover end portions of the plurality of first and second internal electrodes, respectively, in the stacking direction, and the plurality of first and second dielectric patterns have a color different from the plurality of dielectric layers.

16. The multilayer ceramic capacitor of claim 15, wherein the plurality of first and second dielectric patterns include a metal complex.

17. The multilayer ceramic capacitor of claim 16, wherein the content of the metal complex is 0.05 to 3 wt % with respect to an overall mass of the multilayer ceramic capacitor.

18. The multilayer ceramic capacitor of claim 16, wherein the metal content of the metal complex is 0.001 to 0.1 wt % with respect to an overall mass of the multilayer ceramic capacitor.

19. A multilayer ceramic capacitor comprising:

a body including a plurality of dielectric layers and having a first surface and a second surface facing each other in a stacking direction, a third surface and a fourth surface facing each other in a length direction, and a fifth surface and a sixth surface facing each other in a width direction; a plurality of first and second internal electrodes disposed in the body to be alternately exposed through the third and fourth surfaces, having the plurality of dielectric layers therebetween;

a plurality of first dielectric patterns disposed between the plurality of first internal electrodes and the fourth surface; and a plurality of second dielectric patterns disposed between the plurality of second internal electrodes and the third surface, wherein the plurality of first and second dielectric patterns extend and bend to cover end portions of the plurality of first and second internal electrodes, respectively, in the stacking direction.

* * * * *